(12) United States Patent
Zhang et al.

(10) Patent No.: US 11,899,148 B1
(45) Date of Patent: Feb. 13, 2024

(54) SEISMIC IMAGING FREE GAS STRUCTURE IDENTIFICATION METHOD AND SYSTEM

(71) Applicant: Institute of Geomechanics, Chinese Academy of Geological Sciences, Beijing (CN)

(72) Inventors: Hao Zhang, Beijing (CN); Chongyuan Zhang, Beijing (CN); Xingqiang Feng, Beijing (CN); Hui Shi, Beijing (CN)

(73) Assignee: Institute of Geomechanics, Chinese Academy of Geological Sciences, Beijing (CN)

( * ) Notice: Subject to any disclaimer, the term of this patent is extended or adjusted under 35 U.S.C. 154(b) by 0 days.

(21) Appl. No.: 18/156,341

(22) Filed: Jan. 18, 2023

(30) Foreign Application Priority Data

Sep. 5, 2022 (CN) .......................... 202211075452.7

(51) Int. Cl.
  *G01V 1/30* (2006.01)
  *G01V 1/28* (2006.01)

(52) U.S. Cl.
  CPC .............. *G01V 1/306* (2013.01); *G01V 1/282* (2013.01); *G01V 1/301* (2013.01)

(58) Field of Classification Search
  CPC ......... G01V 1/306; G01V 1/282; G01V 1/301
  See application file for complete search history.

(56) References Cited

U.S. PATENT DOCUMENTS

| 2022/0137245 A1* | 5/2022 | Nivlet | ................... G06N 3/084 702/6 |
| 2023/0288589 A1* | 9/2023 | Colombo | ............. G01V 99/005 703/10 |

FOREIGN PATENT DOCUMENTS

| CN | 102495426 A | 6/2012 | |
| CN | 105093292 A | 11/2015 | |
| CN | 112780233 A | 5/2021 | |
| GB | 2592203 A * | 8/2021 | ............. G01V 1/301 |

* cited by examiner

*Primary Examiner* — Krystine E Breier
(74) *Attorney, Agent, or Firm* — Nitin Kaushik

(57) ABSTRACT

The present disclosure relates to a seismic imaging free gas structure identification method and system. The method includes: acquiring a seismic imaging dataset, and annotating free gas structures in the seismic imaging sample data set to obtain a training dataset; using a generative adversarial network (GAN) to expand the training dataset for network training, wherein the GAN includes a generative network and a discrimination network; conducting domain conversion on original label data of the free gas training samples to obtain annotating labels; training a Bayesian neural network according to the free gas training datasets and labels, to obtain a free gas structure identification model; acquiring actual seismic imaging data of a target work area; and conducting, according to the actual seismic imaging data, identification by using the free gas structure identification model.

8 Claims, 7 Drawing Sheets

1: Free gas exists
2: Free gas does not exist
3: Free gas identification data set and labels
4: Sampling for N times
5: Primary results for target domain
6: Aleatoric uncertainty
7: Mean value
8: Variance
9: Free gas identification results for target domain
10: Epistemic uncertainties of prediction results

SEISMIC IMAGING FREE GAS STRUCTURE IDENTIFICATION METHOD AND SYSTEM

CROSS-REFERENCE TO RELATED APPLICATIONS

The application claims priority to Chinese patent application No. 2022110754527, filed on Sep. 5, 2022, the entire contents of which are incorporated herein by reference.

TECHNICAL FIELD

The present disclosure relates to the field of seismic imaging, in particular to a seismic imaging free gas structure identification method and system.

BACKGROUND

Natural gas hydrate is a kind of possible potential energy sources with a huge resource economic potential and play an important role in the global carbon cycle. In unconventional natural gas resources, the natural gas hydrates occupy the largest proportion, and therefore, it is of a great strategic significance of exploring and developing the natural gas hydrates to solve energy shortage and the environmental problems in China. The South China Sea is a main battleground for exploring and developing the natural gas hydrates, wherein several important basins have sufficient sources of accumulation of the natural gas hydrates, migration channels and temperature-pressure conditions and are favorable places for accumulation of the natural gas hydrates. China has conducted a pilot research in the aspect of exploration and development of the natural gas hydrates for nearly 20 years in South China Sea and has obtained real physical samples of the natural gas hydrates in the northern South China Sea. In recent years, discovered from obtaining a plurality of hydrates by a series of investigation works, it is proved that partial deep-water areas in the South China Sea are good in metallogenic conditions of the natural gas hydrates and have a huge resource potential.

Most of hydrate stable domains are located in deep-sea plains, in which mainly two types of hydrates are distributed, i.e. porous hydrates and gas chimney type hydrates. The former is hosted in shallowly developing gravity-flow with high-pore clastic rocks in a form a pore filling, and the hydrates become a part of a pore fluid or skeleton; and the latter exists in a free gas channel in a form of fracture filling to form "free gas" and "gas chimney" structures of vein, bedded and lenticular pure hydrates; and a shallow gas-bearing structure is an important place for migration, accumulation and distribution of the hydrates and is noteworthy.

In the discovered natural gas hydrates, most hydrate deposits are discovered applying a geophysical detection method; and the reflection seismic method and seismic imaging data are important means and basic scientific data for searching for the hydrates. The natural gas hydrates have the characteristic of high velocity, so that unique seismic reflection such as a bottom simulating reflector (BSR), an amplitude blanking zone, polarity reversal and oblique intersection of the BSR and a stratum is formed on a reflection seismic profile. Under normal circumstances, the BSR generally indicates existence of the hydrate deposits; however, the exploration practice on the porous hydrates show that the BSR is not in one-to-one correspondence to this type of hydrate reservoirs; and a shallow sand-bearing layer on a deep water seabed also often shows strong seismic reflection feature with the polarity opposite to that of the seabed and is easily confused with the BSR. As another important type of hydrates, the free gas type hydrates are formed near and at the upper part of free gas in such a way that gas-bearing fluids vertically migrate upward to the natural gas hydrate stability domains through a chimney channel system. A free gas structure is a special associated structure initiated by the fluid effect and is formed under the combined action of overpressure of a gas reservoir, low stress of the structure and a shale barrier. If the free gas structure shows an aggregation appearance on a seismic profile, and a reflection coefficient at an interface between a gas-bearing stratum and a surrounding stratum is large and negative, then the interface belongs to a strong reflection interface. Therefore, shallow gas has irregular strong reflection on the top and chaotic reflection inside, and is lack of high frequency components due to gas bearing.

Reflection feature anomalies (such as the free gas structure) on the seismic profile are noteworthy important markers for indicating existence of the natural gas hydrates. Identification and localization of this type of hydrate markers are foundations of localizing the hydrate deposits and further evaluating saturations and resources of the hydrates. There are also limitations of artificially picking the free gas structure in a seismic data volume: on one hand, artificial picking is time-consuming; and on the other hand, artificial tracking identification is difficult to better make the free gas structure continuously extend to a seismic data coverage area. Therefore, automatically identifying the free gas structure as one of the hydrate markers from the seismic imaging data and finding out its spatial distribution feature is a key technical problem urgently to be solved for improving the exploration effect of the natural gas hydrates in sea regions.

At present, it is further very challenging in the problem of identifying the hydrate markers such as the free gas structure using seismic data. A traditional method of seismically identifying spacial distribution of the hydrates mainly includes two methods, i.e. wave impedance inversion and seismic attribute clustering. A seismic wave impedance inversion method is a widely applied method in stratum parameter inversion methods and is one of effective means for oil and gas reservoir prediction. A wave impedance inversion result depends on division of sedimentary horizons and construction of a low-frequency geological model; while a distribution of the hydrates is controlled by temperatures and pressures, is not entirely controlled by a sedimentary sequence and is usually inconsistent to a stratigraphic sequence, and the hydrates usually exist in inelastic unconsolidated sand-mud sediments at a seabed shallow; and an object of wave impedance inversion is a rock stratum. In the early stage of exploration of the hydrates, especially under the no well condition, wave impedance inversion without well constraint have large multiply solutions, which is a common problem in the wave impedance inversion identification method. The other method is based on a seismic attribute clustering method; and a comprehensive seismic attribute analysis method is less constrained by strata and geologic models and thus adapts to identification on a non-structural controlled natural gas hydrate ore body with an irregular form. Seismic attributes sensitive to the natural gas hydrates are generally amplitude attributes, including a root mean square amplitude, an average absolute amplitude, a maximum peak amplitude and an average peak amplitude. These amplitude attributes, as input vectors of a neural network and test samples, are subjected to attribute clustering analysis. Clustering results are divided with a certain threshold so as to be matched with well data, and then a three-dimensional spatial distribution of the natural gas hydrates is obtained. This method has a high success rate in identification on the porous hydrates with the BSR as the marker, but has a relatively weak ability of characterizing free gas in case of lacking the BSR; and results of a single attribute clustering method also require well constraint and often have large uncertainties in case of no well. Therefore, it often requires mutual authentication among various attribute clustering results, so as to weaken some uncertainties and optimize well drilling targets.

The traditional hydrate seismic identification methods are mainly the seismic wave impedance inversion method and the attribute clustering method. Among them, wave impedance inversion greatly depends on data constraint and construction of a sequence stratum model, and under the no well condition, an inversion result has large multiple solutions; while the seismic attribute clustering method mainly uses various seismic amplitude attributes, has high success rate in identification on the porous hydrates with the BSR as the marker, but has the relatively weak ability of identifying the chimney type hydrates with the free gas as the marker. The two traditional identification methods have common problems that the identification accuracy is low under the no well condition, the ability of identifying the free gas structure is relatively weak due to insufficient spatial extrapolation ability of the identification results and the like.

In recent years, with the rapid development of the computer technology, the neural network having a deep structure gradually shows good performances in various fields, and the deep learning technology is also successfully applied to seismic data processing, parameter estimation and interpretation inversion links. A deep neural network (DNN), as a nonlinear intelligent modeling tool, can identify and estimate parameters from large-scale data in a data-driven mode, thereby greatly saving the manual cost in a data processing and interpretive modeling link and then showing a great application potential.

However, these emerging methods of identifying the hydrate markers based on deep learning are often severely affected by data noise, insufficient training set samples, strong fracture structures and the like, resulting in that anomaly range boundaries output from the identification results of the emerging methods are not very accurate, or have certain uncertainties, and thus a large deviation is caused for subsequent actual BSR distribution and free gas structure scale estimation. Although such emerging methods do not require well constraint and is strong in spatial extrapolation ability and high in identification efficiency, the identification results are often affected by noise interference, insufficient training set samples, strong fracture structures and other factors, resulting in that the markers, especially, anomaly ranges of the free gas structures, in the identification results have great uncertainties, so that a large deviation in estimation of actual distribution ranges of the markers is caused, which is a main bottleneck for the emerging methods leading to practical applications. In such identification results, resources of the uncertainties are diverse and are mainly classified into an epistemic uncertainty and an aleatoric uncertainty. It is lack of the uncertainty quantification means for prediction results in an existing conventional deep learning framework; and therefore, there is a large risk of directly using the prediction results of a deep learning method to make a decision. The Bayesian deep learning method developing in recent years may assist to partially solve the problem of uncertainty estimation. In actual application, it is meaningful of researching classification calculation of the uncertainties. Classification calculation can make a decision maker clearly determine which uncertainties may be reduced by adding data training samples or adjusting network parameters and which identification results cannot be used due to too large uncertainties. Therefore, the robustness and the reliability of the identification results output by the neural network are improved.

Basin deep water areas such as Qiongdongnan in the South China Sea have good accumulating and reservoir-forming geologies and temperature-pressure conditions for the natural gas hydrates. As one of marks for hydrate mineral enrichment, the free gas structures have a unique reflection feature on the seismic profile. How to effectively and accurately identify and find out the spatial distribution feature of the hydrates is a key problem of restricting further cognition on an enrichment distribution rule, a reservoir-forming mode, resource potential and the like of the hydrates in the basin deep water areas in Qiongdongnan.

In seismic exploration of the natural gas hydrates, one of the markers of effectively and accurately identifying the hydrates is the free gas structure, which is one of important problems in efficient exploration of the natural gas hydrates. The traditional seismic inversion and attribute methods are relatively large in errors of the identification results under the no well condition and are insufficient in spatial extrapolation ability; and although the emerging identification method based on deep learning is high in efficiency, the uncertainties in the results cannot be quantified.

SUMMARY

A purpose of the present disclosure is to provide a seismic imaging free gas structure identification method and system, so as to improve the accuracy of an identification result.

In order to achieve the above objective, the present disclosure provides the following solution:

A seismic imaging free gas structure identification method includes:
  acquiring a seismic imaging sample data set, and annotating free gas structures in the seismic imaging sample data set to obtain an actual data training set;
  using a generative adversarial network to extend the actual data training set to obtain free gas training samples, wherein the generative adversarial network includes a generative network and a discrimination network;
  conducting domain conversion on original label data of the free gas training samples to obtain target domain expected output results;
  training a Bayesian neural network according to the free gas training samples and the target domain expected output results, to obtain a free gas structure identification model;
  acquiring actual seismic imaging data of a target work area; and
  conducting, according to the actual seismic imaging data, identification by using the free gas structure identification model, to obtain free gas structure identification results.

Optionally, using the generative adversarial network to extend the actual data training set to obtain the free gas training samples specifically includes:
  conducting, by the actual data training set, simulation using the generative network to obtain simulated images;
  conducting comparison, by using the discrimination network, on the simulated images and real images in the actual data set to obtain identified classification results; and determining the free gas training samples according to the model images and the identified classification results.

Optionally, training the Bayesian neural network according to the free gas training samples and the target domain expected output results, to obtain a free gas structure identification model specifically includes:

using a Monte Carlo Dropout method to conduct variance inference according to the free gas training samples and the target domain expected output results; and learning network weights of the Bayesian neural network by minimizing KL divergences in variational distribution of the Bayesian neural network and KL divergences in posterior distribution of the Bayesian neural network to obtain the free gas structure identification model.

Optionally, acquiring the actual seismic imaging data of the target work area specifically includes:

acquiring seismic shot gather data in the target work area; and conducting prestack migration imaging on the seismic shot gather data to obtain the actual seismic imaging data.

A seismic imaging free gas structure identification system includes:

an acquiring and annotating module, configured to acquire a seismic imaging sample data set and annotate free gas structures of the seismic imaging sample data set to obtain an actual data training set;

an extending module, configured to use a generative adversarial network to extend the actual data training set to obtain free gas training samples, wherein the generative adversarial network includes a generative network and a discrimination network;

a domain conversion module, configured to conduct domain conversion on original label data of the free gas training samples to obtain target domain expected output results;

a training module, configured to train a Bayesian neural network according to the free gas training samples and the target domain expected output results, to obtain a free gas structure identification model;

an acquiring module, configured to acquire actual seismic imaging data of a target work area; and an identification module, configured to conduct, according to the actual seismic imaging data, identification by using the free gas structure identification model, to obtain free gas structure identification results.

Optionally, the extending module specifically includes:

a simulation unit, configured to conduct, by the actual data training set, simulation using the generative network to obtain simulated images;

a comparison unit, configured to conduct comparison, by using the discrimination network, on the simulated images and real images in the actual data set to obtain identified classification results; and a free gas training sample determination unit, configured to determine the free gas training samples according to the model images and the identified classification results.

Optionally, the training module specifically includes:

a training unit, configured to use the Monte Carlo Dropout method to conduct variance inference according to the free gas training samples and the target domain expected output results; and learn network weights of the Bayesian neural network by minimizing KL divergences in variational distribution of the Bayesian neural network and KL divergences in posterior distribution of the Bayesian neural network to obtain the free gas structure identification model.

Optionally, the acquiring module specifically includes:

an acquiring unit, configured to acquire seismic shot gather data in the target work area; and a prestack migration imaging unit, configured to conduct prestack migration imaging on the seismic shot gather data to obtain the actual seismic imaging data.

According to the specific embodiments of the present disclosure, the present disclosure discloses the following technical effects:

According to the present disclosure, the seismic imaging sample data set is acquired, and the free gas structures of the seismic imaging sample data set are annotated to obtain the actual data training set; the actual data training set is extended using the generative adversarial network to obtain the free gas training samples, wherein the generative adversarial network includes the generative network and the discrimination network; domain conversion is conducted on the original label data of the free gas training samples to obtain the target domain expected output results; the Bayesian neural network is trained according to the free gas training samples and the target domain expected output results, to obtain the free gas structure identification model; the actual seismic imaging data of the target work area is acquired; and according to the actual seismic imaging data, identification is conducted using the free gas structure identification model, to obtain the free gas structure identification results. The present disclosure uses the generative adversarial network to extend the actual data training set and the Bayesian network to construct the free gas structure identification model, so as to improve the accuracy of the identification results.

BRIEF DESCRIPTION OF DRAWINGS

In order to more clearly describe the technical solutions of the embodiments of the present disclosure or in the prior art, the accompanying drawings required to be used in the embodiments are briefly described below. Apparently, the accompanying drawings described below are only some embodiments of the present disclosure. Those of ordinary skill in the art may further obtain other accompanying drawings based on these accompanying drawings without inventive effort.

DETAILED DESCRIPTION OF THE EMBODIMENTS

The technical solutions in the embodiments of the present disclosure are described clearly and completely in the following with reference to accompanying drawings in the embodiments of the present disclosure. Apparently, the described embodiments are only part rather than all of the embodiments of the present disclosure. All other embodiments that persons of ordinary skill in the art obtain without creative efforts based on the embodiments of the present disclosure also fall within the scope of the present disclosure.

A purpose of the present disclosure is to provide a seismic imaging free gas structure identification method and system, so as to improve the accuracy of an identification result.

In order to make the objective, the features and the advantages of the present disclosure more apparent, the present disclosure is further described in detail in combination with the accompanying drawings and the specific embodiments below.

Figure 1:
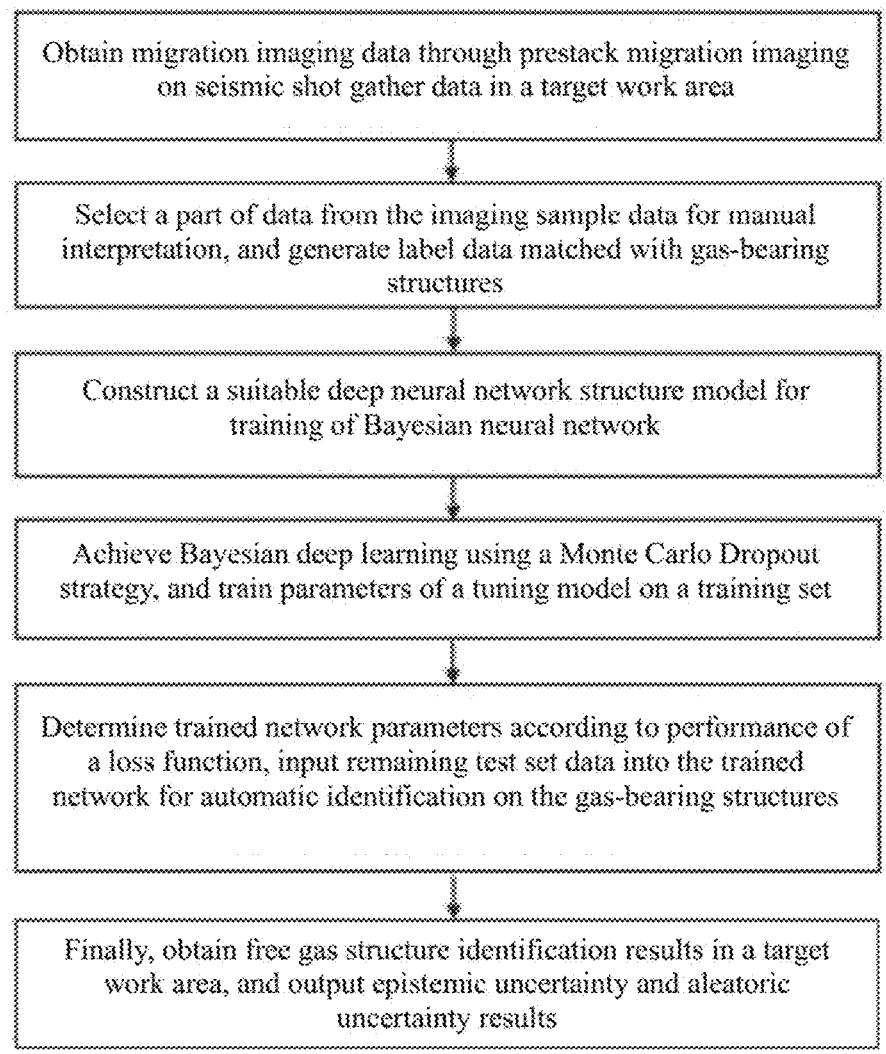
FIG. 1 is a flow diagram of a seismic imaging free gas structure identification method of the present disclosure.
Figure 7:
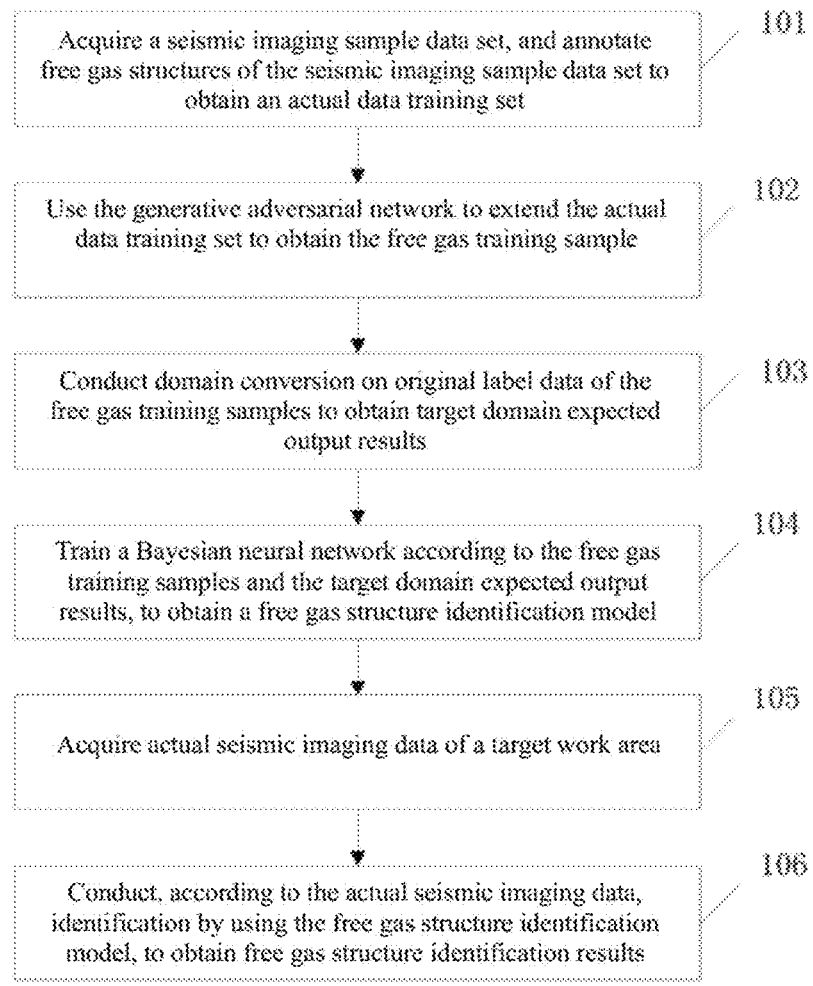
FIG. 7 is a flow chart of a seismic imaging free gas structure identification method of the present disclosure.

The present disclosure is proposed aiming to the automatic identification problem of free gas structures in seismic data under the no well condition in seismic exploration for natural gas hydrates. As shown in FIG. 7 and FIG. 1, the present disclosure provides a seismic imaging free gas structure identification method for accurately identifying the spacial distribution condition of the free gas structures. The method includes:

Step 101: acquiring a seismic imaging sample data set, and annotating free gas structures in the seismic imaging sample data set to obtain an actual data training set.

Through prestack migration imaging on seismic shot gather data in a target work area, migration imaging data (i.e., seismic imaging sample data) is obtained as an input of training data of a neural network. The neural network at this time is a generative adversarial network.

The showing feature of the free gas is an aggregation appearance in seismic data, a reflection coefficient at an interface between a gas-bearing stratum and a surrounding stratum is large and negative, and the interface belongs to a strong reflection interface. Therefore, shallow gas has irregular strong reflection on the top and chaotic reflection inside, and is lack of high frequency components due to gas bearing. Based on this, a part of data is selected from the obtained imaging sample data for manual interpretation, and label data matched with the imaging sample data is generated to serve as training set data for training of a deep neural network.

Step 102: using a generative adversarial network to extend the actual data training set to obtain free gas training samples, wherein the generative adversarial network includes a generative network and a discrimination network.

Step 102 specifically includes: conducting, by the actual data training set, simulation using the generative network to obtain simulated images; conducting comparison, by using the discrimination network, on the simulated images and real images in the actual data set to obtain identified classification results; and determining the free gas training samples according to the model images and the identified classification results.

Step 103: conducting domain conversion on original label data of the free gas training samples to obtain target domain expected output results.

Step 104: training a Bayesian neural network according to the free gas training samples and the target domain expected output results, to obtain a free gas structure identification model.

Step 104 specifically includes:
using the Monte Carlo Dropout method to conduct variance inference according to the free gas training samples and the target domain expected output results; and learning network weights of the Bayesian neural network by minimizing KL divergences in variational distribution of the Bayesian neural network and KL divergences in posterior distribution of the Bayesian neural network to obtain the free gas structure identification model.

Constructing a suitable deep neural network structure model includes: inputting a number of neural cells, a number of layers of the neural network and the like, and initializing weight coefficients and biases of the network. A training set is input into the neural network for training, network parameters are adjusted, and the training degree of the network and a network structure are evaluated through performances of a target function.

Bayesian deep learning is achieved using the Monte Carlo Dropout strategy, Dropout is added in an intermediate layer of an original deep neural network model, and at this time, the deep neural network model is the Bayesian network. Parameters of a tuning model are trained on the training set. Then, in a test process, the Dropout still tests a same test set sample for N times to obtain N output prediction results; a mean value of the N output prediction results serves as a final output of the network; and a variance distribution of the N output prediction results serves as uncertainty estimation of the network. The trained network parameters are determined according to the performance of a loss function; and remaining test set data required to be predicted is input into the neural network for automatic identification on the free gas structures.

Step 105: acquiring actual seismic imaging data of a target work area.

Step 105 specifically includes:
acquiring seismic shot gather data in the target work area; and conducting prestack migration imaging on the seismic shot gather data to obtain the actual seismic imaging data.

Step 106: conducting, according to the actual seismic imaging data, identification by using the free gas structure identification model, to obtain free gas structure identification results. Finally, the free gas structure identification results in the target work area are obtained, followed by outputs of epistemic uncertainty and aleatoric uncertainty results, for assisting to evaluate the accuracy of the identification results of the free gas structures.

The present disclosure focuses on the seismic intelligent identification problems of hydrate markers under the no well condition, and conducts hydrate marker identification and an uncertainty quantification research based on the Bayesian neural network. On the basis of solving the identification problems, the uncertainties of the identification result are quantified, and then more accurate identification results for the hydrate markers are obtained. The present disclosure can provide an intelligent data-driven hydrate marker identification method for natural gas hydrate exploration under the no well condition in a reconnaissance stage, which has a great application value and an actual significance in promoting efficient exploration of the natural gas hydrates.

The present disclosure has three cores: first, the present disclosure is a method of training the neural network in a data-driven mode and making prediction, so there is a need for preparing sufficient training data for the neural network; a general data sample is insufficient for training the neural network, so there is a need for making certain extension for the training sample and the label data firstly; and the generative adversarial network is used herein. Second, the core method is to use the Bayesian neural network strategy; compared with the traditional neural network, a prior distribution idea is introduced into the Bayesian neural network; the weight coefficients and the like of the network meet a certain distribution rule rather than being a specific number; when a probability distribution of labels keeps consistent to a distribution of the weight coefficients and input data of the network, the Bayesian neural network may better learn a function relationship among the data; and in actual application, as the distribution of the label data of the free gas structures may be inconsistent to that of weights of the network, there is a need for finishing domain conversion through a certain transform. Third, the core is the principle of the Bayesian neural network, compared with the traditional neural network, in addition to outputting a spacial distribution of the free gas structures, the Bayesian neural network can further output various uncertainty attributes of the results at the same time, so that accurate identification results may be obtained. The present disclosure further provides more detailed description of a seismic imaging free gas structure identification method in actual application.

(1) Enhancement and Extension of Actual Data Samples Based on Generative Adversarial Network (GAN)

Firstly, data sample distributions at different positions and with different features are selected from the imaging data set for interpretation of the free gas structures, and interpretations serve as label data for two objects required to be identified. If the free gas structure shows an aggregation appearance on a seismic profile, and a reflection coefficient at an interface between a gas-bearing stratum and a surrounding stratum is large and negative, the interface belongs to a strong reflection interface. Therefore, shallow gas has irregular strong reflection on the top and chaotic reflection inside, and is lack of high frequency components due to gas bearing. Based on these features, according to imaging and seismic attributes and the like, structures of containing these features in a part of data are interpreted, and a label data set for network training is generated.

Manually interpreting the generated label data is still relatively limited. Through application exploration of a convolutional neural network in an early research, although the data set is extended by various simple data augmentation methods (such as flipping, rotation and stretching), there is still a problem of insufficient training data, resulting in that the identification results have obvious biases in some regions; the volume of the label data is also relatively limited; and then the accuracy of prediction of the neural network and further generalization ability are constrained. In order to solve the problem of insufficient training set data, the generative adversarial network (GAN) method is employed herein to extend the actual data training set for free gas structure interpretation, which provides sufficient training set data for a research related to application of the Bayesian neural network.

The generative adversarial network (GAN) makes two neural networks conduct learning in a mutual game playing mode. The generative adversarial network is composed of a generative network G and a discrimination network D. In a data space, input data is obtained through random sampling, and the input data z is transmitted to the generative network G. The generative network simulates samples in the training set, and an output result G(z) would approximate a real imaging result to the maximum. A purpose of the discrimination network D is to compare the result G(z) output by the generative network with a real image and output an identified classification result. The generative network has a purpose of generating an image close to the real through identification of the discrimination network; and the discrimination network has a purpose of distinguishing the image of the generative network, so that the two networks continuously play games. Whichever of the networks wins, image sample data close to the real may be generated, and thus the number of samples of the actual training data is increased. The present disclosure intends to extend the interpreted data set in this way and extend the initial data set by 15-20 times. A specific calculation formula is as follows:

$$\min_G \max_D V(D,G) = E_{x \sim p_{data}(x)}[\log D(x)] + E_{z \sim p_z(z)}[\log(1-D(G(z)))] \quad (1)$$

The formula is a principle formula for the GAN, and data extension is conducted based on the game playing mode herein. The formula (1) is formed by two terms; x serves as input data for inputting a real image converted from a profile; z serves as image noise of the generative network G; G(z) represents a new image (sample) output by the generative network; the network D calculates an error between the new image and the original real image, and the error is represented by D(x); D(G(z)) is a probability obtained by judging, by the network D, whether the sample generated by G is real; E represents mathematical expectation calculation; $E_{x \sim p_{data}(x)}$ is mathematical expectation of probability distribution $p_{data}(x)$ of the input data x; and $E_{z \sim p_z(z)}$ is mathematical expectation of a probability distribution $p_z(z)$ of the input network noise data z. Herein, G hopes that larger D(G(z)) is better, which also means that smaller error V(D, G), calculated by the network, between the new image and the original real image is better. Therefore, a minimum value minG is solved from the formula (1) for G. The stronger the ability of D is, the larger D(x) should be, and the smaller D(G(x)) should be. At this time, V (D,G) is increased. Therefore, a maximum value maxD is solved from the formula (1) for D.

(2) Conversion of Input Training Data Domain

Compared with the traditional neural network, the prior distribution idea is introduced into the Bayesian neural network; and a prediction result is calculated by the network through the input data. As described in a formula (2), distribution of output results depends on that of the input data and weights. Therefore, if the possibility distribution of the labels keeps consistent to a distribution of the network weights and the input data, the Bayesian neural network may better learn the function relationship among the data. However, under the actual circumstance, the distribution of label data indicating the free gas structures may be inconsistent to that of the network weights and the input data. Therefore, a distribution domain, in which the original label data is located, is defined as an original domain; and a distribution domain meeting an assumption of the Bayesian neural network is defined as a target domain. Herein, a domain conversion process is established, and is described as follows:

$$\tilde{Y} = f_1(Y) \quad (2)$$

wherein $\tilde{Y}$ represents a distribution of free gas regions in the target domain after domain conversion, and a distribution type is identical or close to that of the network weights of the Bayesian neural network. $f_1$ represents an operator for domain conversion, which may convert the training data from the original domain to the target domain. $f_1$ has to be an invertible operator, for example, an index and a logarithmic function, since it finally needs to reduce the predicted free gas structure identification result back to the original domain from the target domain. $f_1$ may be a kind of functional transformation and also a kind of neural networks. If the distribution type of the original label data Y is identical to $\tilde{Y}$, $f_1$ may represent an identity function. The free gas training sample X and the target domain expected output result $\tilde{Y}$ are input into the network for training; and herein, the used Bayesian neural network model is described as follows;

$$NN^* = M(\tilde{Y}, NN(X)) \quad (3)$$

wherein NN* represents a function relationship learned by the Bayesian neural network through training; and M (·) represents a minimized target domain identification result $\tilde{Y}$ and a corresponding predicted value NN(X). When the trained model is applied to the test set data, label-free seismic data samples X* are input into the network NN* to obtain identification results of a BSR or the free gas structures. The target domain prediction results are reduced to the original domain prediction results using inverse operation $f_1^{-1}$ of $f_1$, and finally, the prediction results of the distribution of the free gas structures in a coverage range of the seismic data are obtained. Y* is the identification result of the original domain. The process is represented as follows:

$$Y^* = f_1^{-1}(NN^*(X^*)) \quad (4)$$

(3) Bayesian Neural Network Framework and Uncertainty Calculation

Figure 5:
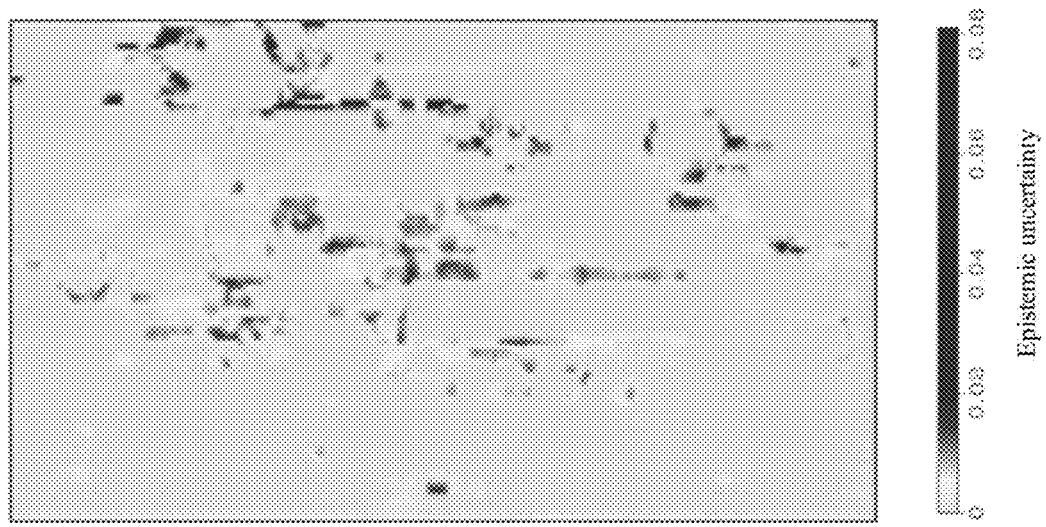
FIG. 5 is a schematic diagram of corresponding epistemic uncertainty results output by a network.
Figure 6:
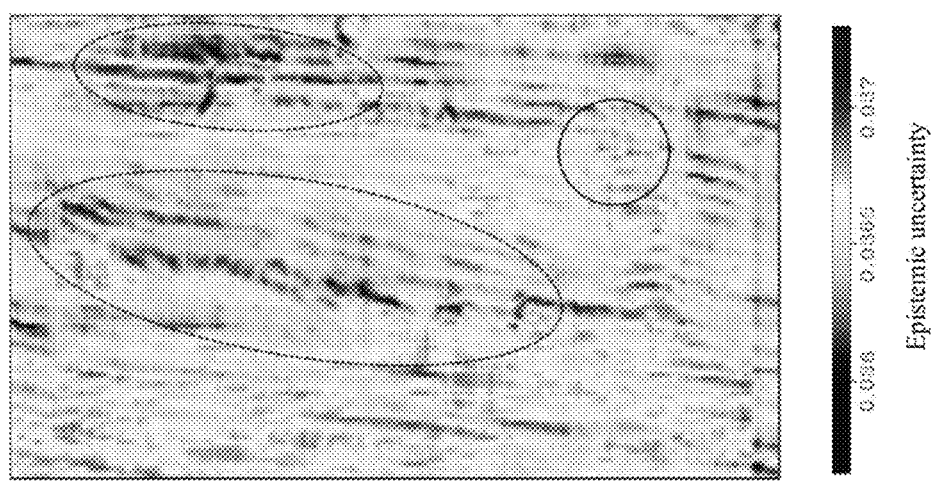
FIG. 6 is a schematic diagram of aleatoric uncertainty results output by a network.

A general neural network may only obtain one distribution range prediction result, as shown in FIG. 5; and in addition to outputting a range, the Bayesian network may further output a description of a reliability degree of the range, i.e. the uncertainty, as shown in FIG. 6 and FIG. 7. In step (3), the Bayesian neural network framework and uncertainty calculation mean that data subjected to domain conversion is input into the Bayesian neural network, and corresponding results are output; and in step (2), domain conversion of input training data means that before being input into the network, the data requires to be converted, so as to meet the condition assumption of the Bayesian network.

The Bayesian neural network (BNN) is a machine learning algorithm obtained by combining the Bayesian theory with an artificial neural network (ANN). Weights of the ANN are fixed values; while weights of the BNN are a kind of probability distributions. For the Bayesian neural network, given the training data X={$x_1, \ldots, x_n$} and a corresponding output Y={$y_1, \ldots, y_n$}, probability outputs of parameters w of a function $y=f^w(x)$ require to be obtained; the weights w and biases b in the neural network are all represented by the probability distribution, but not like in the traditional neural network (such as the CNN), they have specific parameters values. A Bayesian deep learning method can output the probability distributions and can quantify the uncertainties, since in the Bayesian deep learning method, given a training data set D and a network input x*, a distribution of the prediction results y* of the network model may be obtained through network training. This process may be expressed by a following formula:

$$p(y^*|x^*,D) = \int p(y^*|x^*,w)p(w|D)dw \quad (5)$$

In the formula (5), p(y*|x*,w) is a distribution of the prediction results y* of the network model, given an input x* of the network model and the network parameters w; and p(w|D) is a distribution of the network parameters w obtained by network training with the training data set D. During Bayesian deep learning, a purpose of neural network training is to obtain a distribution p(w|D) of the network parameters w.

In the actual operation process, p(w|D) cannot make analytical solution generally, and it requires to integrate a whole parameter space. So, a variational distribution $q_\theta(w)$ is required to approximate a posterior distribution p(w|D), a Gaussian distribution is generally used for approximating θ, and thus θ~(μ,σ²) The problem of solving the posterior distribution is converted to the optimization problem of solving optimal θ in this way; this process may be achieved by minimizing Kullback-Leibler (KL) divergences in two distributions; and achievement of this process is the famous variance inference process, that is, given the training data, an approximate value, closest to the precise condition, of a conditional probability of a latent variable is calculated in the sense of the KL divergences. The process is expressed as follows:

$$p(y^*|x^*D) \approx q_\theta(y^*|x^*) = \int p(y^*|x^*,w)q_\theta(w)dw \quad (6)$$

The strategy is achieved by deriving different Bayesian neural networks according to different approximates p(w|D), approximates p(w|D); then, an implementation method for the Bayesian neural network would be employed to achieve identification on the free gas structures; and uncertainty quantification results, including the epistemic uncertainty, the aleatoric uncertainty and a hybrid uncertainty, are output while the prediction results are output. Var is a variance under the variational distribution and is calculated following a following formula:

$$\text{Var}_{q_\theta(y^*|x^*)}(y^*) = \int \{E_{p(y^*|x^*,w)}(y^* y^{*T}) - [E_{p(y^*|x^*,w)}(y^*)][E_{p(y^*|x^*,w)}(y^*)]^T\} q_\theta(w)dw + \int \{[E_{p(y^*|x^*,w)}(y^*)][E_{p(y^*|x^*,w)}(y^*)]^T - [E_{q_\theta(y^*|x^*)}(y^*)][E_{q_\theta(y^*|x^*)}(y^*)]^T\} q_\theta(w)dw \quad (7)$$

In the formula (7), the first term in the right of the equal sign is the aleatoric uncertainty, and the second term is the epistemic uncertainty; $q_\theta(w)$ requires the solved variational distribution to approximate the posterior distribution p(w|D);

$$E_{q_\theta(y^*|x^*)}(y^*) \approx \frac{1}{N} \sum_{n=1}^{N} P(y^*|x^*,w)$$

is an expected value under a random density function; N represents a number of random sampling in the implementation process; $E_{p(y^*|x^*,w)}$ (y*) is an expected value under the posterior distribution; $E_{q_\theta(y^*|x^*)}(y^*)$ is an expected value under the random density function; and T is a transpose.

Each weight in the BNN is sampled from a normal distribution θ; expected that $q_\theta(w)$ is close to p(w|D), the KL divergences are used for quantifying a matching degree of the two distributions; and the possibility distribution θ* approximated with the KL divergences may be expressed as follows:

$$\theta^* = \arg \min_\theta KL[q_\theta(w)\|p(w|D)] \quad (8)$$

During training of the BNN, by sampling the Gaussian distribution (the prior distribution), samples of the parameters w of the neural network may be obtained. Forward propagation is conducted through the network, a loss of back propagation calculation is calculated, and the network parameters are optimized. Finally, by sampling the posterior distribution of the weights of the BNN for many times, a set of the identification results is obtained. A mean value of the set represents an expectation of the output result of the BNN; and a variance of the set represents an uncertainty of the output result.

Compared with the traditional neural network, the Bayesian neural network assumes that the model parameters obey the Gaussian distribution or a certain prior distribution, the network training process is equivalent to the posterior distribution, solved under the condition given the distribution condition of the training set data, of the parameters of the network model. Although a definition of the Bayesian neural network is simple and convenient, calculation is complex, it requires to modify an original network structure.

Monte Carlo Dropout is an implementation method for the Bayesian neural network, in which random Dropout is conducted on the model parameters in the test process, so as to obtain different outputs under a same input; and a mean value and a variance of the outputs are solved so as to quantify the uncertainties of the network outputs. This method is equivalent to a minimized KL divergence, approximating the posterior distribution of the network.

Figure 3:
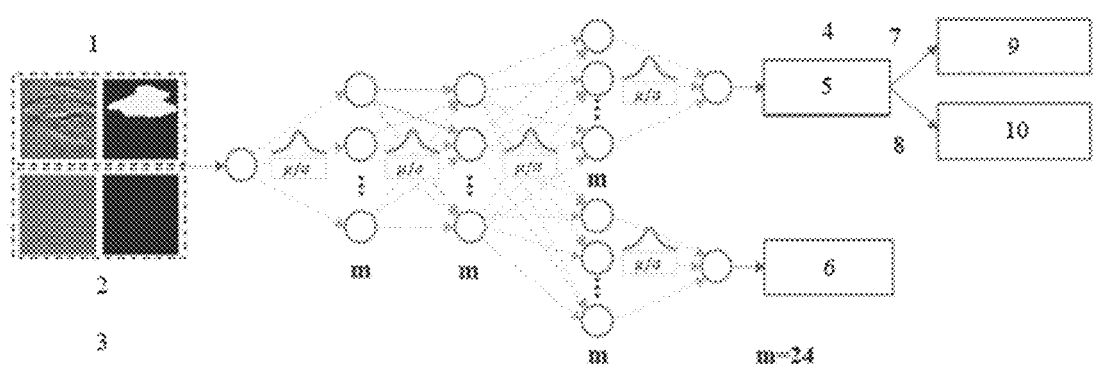
FIG. 3 is a schematic diagram of a Bayesian neural network structure and a training strategy of the present disclosure.

As shown in FIG. 3, Bayesian deep learning is achieved using the Monte Carlo Dropout method, Dropout is added in the intermediate layer of the original deep neural network model. Parameters of a tuning model are trained on the training set. Then, in a test process, the Dropout still tests a same test set sample for N times to obtain N output prediction results; a mean value of the N output prediction results serves as a final output of the network; and a variance distribution of the N output prediction results serves as uncertainty estimation of the network. In general, the test set samples should contain the aleatoric uncertainty, guiding better preprocessing on the input training data set. In FIG. 3, a represents a variance distribution; p represents the mean value; and m represents a number of neural cells, deciding a scale of the network. For the actual data, it is also subjected to N tests to obtain the mean value as a final output of the network, and a corresponding variance distribution serves as uncertainty quantification. In theory, the actual data should contain data samples (i.e. the epistemic uncertainty) never seen by the network, guiding to generate corresponding samples and making the network learn sufficient samples.

Figure 2:
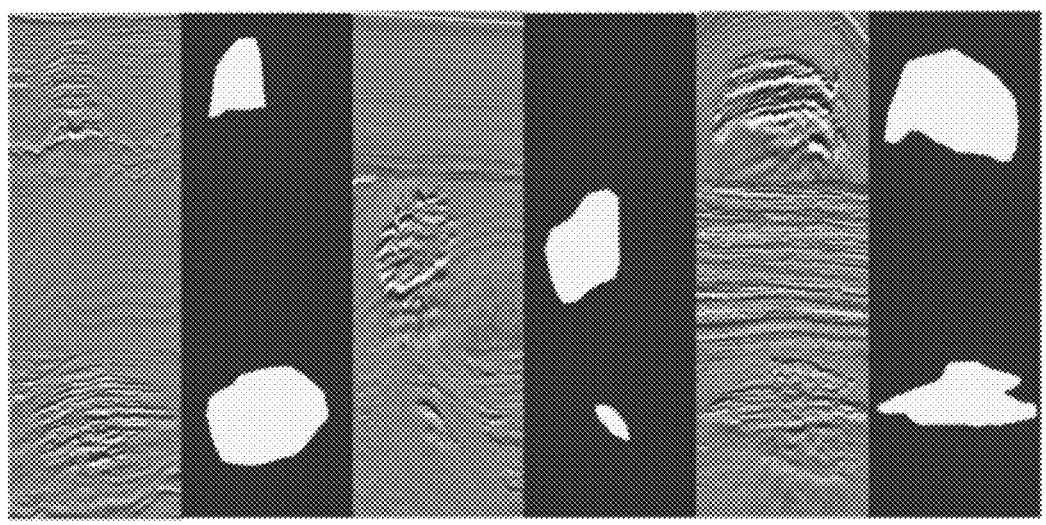
FIG. 2 is a schematic diagram of partial training data and label data for neural network training of the present disclosure.
Figure 4:
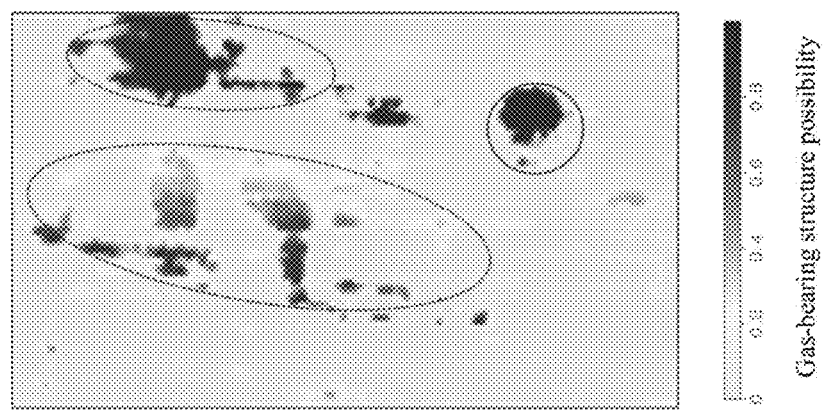
FIG. 4 is a schematic diagram of a position probability, primarily predicted by gas-bearing structure identification with actual data, of gas-bearing structures.

Herein, an identification and uncertainty output test is conducted on two-dimensional data free gas structures, and it proves the effectiveness of the present disclosure. First, seismic imaging is conducted to generate an imaging data set; during manually interpreting and annotating gas-bearing structures, manual annotations require refer to change conditions of an amplitude and a frequency in a window and have certain measurement errors own; and the seismic imaging data further contains a certain degree of noise, an incompletely converged diffracted wave and the like, so the predicted results using the machine learning method inevitably have some errors. FIG. 2 shows partial data samples and label data extracted from the data set; and in the label data, a white color represents 1, indicating a free gas structure, and a background black color represents 0, indicating a free gas-free structure. A schematic diagram of a primary two-dimensional research result is used for describing this test step. FIG. 4 is a diagram of a position probability, primarily predicted by gas-bearing structure identification with actual data, of gas-bearing structures, showing gas-bearing structure positions output after small data set network training according to the above principle and primarily indicating the spacial distribution possibility of free gas. FIG. 5 is a schematic diagram of corresponding epistemic uncertainty results output by a network; and the uncertainties of boundaries of the gas-bearing structures may be observed from the epistemic uncertainty results, and the positions and the scales of the free gas structures are primarily indicated. In FIG. 5, the epistemic uncertainty attribute output by the network is more accurate to characterize boundaries of anomaly zones, and the scales of free gas zones can be better cognized based on this attribute. FIG. 6 is a schematic diagram of corresponding aleatoric uncertainty results output by a network, indicating a region with a large error of the prediction result; and the aleatoric uncertainty indicates that a region (a dotted line circle) with low credibility would be eliminated in a final free gas structure spacial distribution result, and a region (a solid line circle) with high credibility would be retained.

The present disclosure further provides a seismic imaging free gas structure identification system, including:

an acquiring and annotating module, configured to acquire a seismic imaging sample data set and annotate free gas structures of the seismic imaging sample data set to obtain an actual data training set;

an extending module, configured to use a generative adversarial network to extend the actual data training set to obtain free gas training samples, wherein the generative adversarial network includes a generative network and a discrimination network;

a domain conversion module, configured to conduct domain conversion on original label data of the free gas training samples to obtain target domain expected output results;

a training module, configured to train a Bayesian neural network according to the free gas training samples and the target domain expected output results, to obtain a free gas structure identification model;

an acquiring module, configured to acquire actual seismic imaging data of a target work area; and an identification module, configured to conduct, according to the actual seismic imaging data, identification by using the free gas structure identification model, to obtain free gas structure identification results.

As an alternative implementation, the extending module specifically includes:

a simulation unit, configured to conduct, by the actual data training set, simulation using the generative network to obtain simulated images; a comparison unit, configured to conduct comparison, by using the discrimination network, on the simulated images and real images in the actual data set to obtain identified classification results; and a free gas training sample determination unit, configured to determine the free gas training samples according to the model images and the identified classification results.

As an alternative implementation, the training module specifically includes:

a training unit, configured to use the Monte Carlo Dropout method to conduct variance inference according to the free gas training samples and the target domain expected output results; and learn network weights of the Bayesian neural network by minimizing KL divergences in variational distribution of the Bayesian neural network and KL divergences in posterior distribution of the Bayesian neural network to obtain the free gas structure identification model.

As an alternative implementation, the acquiring module specifically includes:

an acquiring unit, configured to acquire seismic shot gather data in the target work area; and a prestack migration imaging unit, configured to conduct prestack migration imaging on the seismic shot gather data to obtain the actual seismic imaging data.

The present disclosure focuses on the intelligent identification problems of the hydrate markers under the no well condition in the seismic data and provides seismic imaging free gas construction identification. The method provided by the present disclosure is a description method for automatic identification of the hydrate markers and uncertainties based on the Bayesian neural network. The method uses the reflection feature of the markers, and achieves training and prediction of the Bayesian neural network by using the actual training data and an efficient network training strategy, thereby achieving intelligent identification and uncertainty quantification of the hydrate markers. The present disclosure provides an efficient and intelligent marker identification method for natural gas hydrate exploration under the no well condition in a reconnaissance stage; the identification results can provide a scientific decision-making basis for selection of hydrate exploration target areas from research areas, reserve estimation and drilling deployment; and the efficient and intelligent marker identification method has a wide application prospect.

Various embodiments in this specification employs progressive description; each embodiment highlights differences from other embodiments; and same and similar parts among various embodiments may just refer to each other. With regard to the systems disclosed in the embodiments, as corresponding to the methods disclosed in the embodiments, the systems are relatively simply described, and relevance may just refer to partial description of the method.

Specific examples are applied to explain the principle and the implementations of the present disclosure herein; the descriptions of the above embodiments are only for helping understand the method of the present disclosure and the core idea thereof and meanwhile, to a person of ordinary skill in the art, changes may be made on all of the specific implementations and the application ranges according to the idea of the present disclosure. To sum up, the content of this specification should not be understood as limiting to the present disclosure.

What is claimed is:

1. A seismic imaging free gas structure identification method, comprising:
   acquiring a seismic imaging sample data set, and annotating free gas structures in the seismic imaging sample data set to obtain an actual data training set;
   using a generative adversarial network to extend the actual data training set to obtain free gas training samples, wherein the generative adversarial network comprises a generative network and a discrimination network;
   conducting domain conversion on original label data of the free gas training samples to obtain target domain expected output results;
   training a Bayesian neural network according to the free gas training samples and the target domain expected output results, to obtain a free gas structure identification model;
   acquiring actual seismic imaging data of a target work area; and
   conducting, according to the actual seismic imaging data, identification by using the free gas structure identification model, to obtain free gas structure identification results.

2. The seismic imaging free gas structure identification method according to claim 1, wherein using the generative adversarial network to extend the actual data training set to obtain the free gas training samples specifically comprises:
   conducting, by the actual data training set, simulation using the generative network to obtain simulated images;
   conducting comparison, by using the discrimination network, on the simulated images and real images in the actual data set to obtain identified classification results; and
   determining the free gas training samples according to the model images and the identified classification results.

3. The seismic imaging free gas structure identification method according to claim 1, wherein training the Bayesian neural network according to the free gas training samples and the target domain expected output results, to obtain a free gas structure identification model specifically comprises:
   using a Monte Carlo Dropout method to conduct variance inference according to the free gas training samples and the target domain expected output results; and learning network weights of the Bayesian neural network by minimizing KL divergences in variational distribution of the Bayesian neural network and KL divergences in posterior distribution of the Bayesian neural network to obtain the free gas structure identification model.

4. The seismic imaging free gas structure identification method according to claim 1, wherein acquiring the actual seismic imaging data of the target work area specifically comprises:
   acquiring seismic shot gather data in the target work area; and
   conducting prestack migration imaging on the seismic shot gather data to obtain the actual seismic imaging data.

5. A seismic imaging free gas structure identification system, comprising:
   an acquiring and annotating module, configured to acquire a seismic imaging sample data set and annotate free gas structures of the seismic imaging sample data set to obtain an actual data training set;
   an extending module, configured to use a generative adversarial network to extend the actual data training set to obtain free gas training samples, wherein the generative adversarial network comprises a generative network and a discrimination network;
   a domain conversion module, configured to conduct domain conversion on original label data of the free gas training samples to obtain target domain expected output results;
   a training module, configured to train a Bayesian neural network according to the free gas training samples and the target domain expected output results, to obtain a free gas structure identification model;
   an acquiring module, configured to acquire actual seismic imaging data of a target work area; and
   an identification module, configured to conduct, according to the actual seismic imaging data, identification by using the free gas structure identification model, to obtain free gas structure identification results.

6. The seismic imaging free gas structure identification system according to claim 5, wherein the extending module specifically comprises:
   a simulation unit, configured to conduct, by the actual data training set, simulation using the generative network to obtain simulated images;
   a comparison unit, configured to conduct comparison, by using the discrimination network, on the simulated images and real images in the actual data set to obtain identified classification results; and a free gas training sample determination unit, configured to determine the free gas training samples according to the model images and the identified classification results.

7. The seismic imaging free gas structure identification system according to claim 5, wherein the training module specifically comprises:

a training unit, configured to use the Monte Carlo Dropout method to conduct variance inference according to the free gas training samples and the target domain expected output results; and learn network weights of the Bayesian neural network by minimizing KL divergences in variational distribution of the Bayesian neural network and KL divergences in posterior distribution of the Bayesian neural network to obtain the free gas structure identification model.

8. The seismic imaging free gas structure identification system according to claim 5, wherein the acquiring module specifically comprises:

an acquiring unit, configured to acquire seismic shot gather data in the target work area; and a prestack migration imaging unit, configured to conduct prestack migration imaging on the seismic shot gather data to obtain the actual seismic imaging data.

\* \* \* \* \*